(12) United States Patent
Lin et al.

(10) Patent No.: US 10,183,656 B2
(45) Date of Patent: Jan. 22, 2019

(54) ROAD SLOPE ESTIMATION SYSTEM FOR AUTOMATIC PARKING ASSIST

(71) Applicant: Changan US R&D Center, Inc., Plymouth, MI (US)

(72) Inventors: William Chin-Woei Lin, Troy, MI (US); Yixin Chen, Novi, MI (US); Ke Ding, Chongqing (CN); Xiao He, Chongqing (CN)

(*) Notice: Subject to any disclaimer, the term of this patent is extended or adjusted under 35 U.S.C. 154(b) by 29 days.

(21) Appl. No.: 15/424,874

(22) Filed: Feb. 5, 2017

(65) Prior Publication Data

US 2018/0222456 A1   Aug. 9, 2018

(51) Int. Cl.
*B60T 8/172* (2006.01)
*B60T 7/12* (2006.01)
*B60T 8/32* (2006.01)
*B60T 8/173* (2006.01)

(52) U.S. Cl.
CPC .............. *B60T 8/172* (2013.01); *B60T 7/122* (2013.01); *B60T 8/173* (2013.01); *B60T 8/3205* (2013.01); *B60T 2201/06* (2013.01); *B60T 2201/10* (2013.01)

(58) Field of Classification Search
None
See application file for complete search history.

(56) References Cited

U.S. PATENT DOCUMENTS

2015/0166073 A1* 6/2015 D'Amato ............ B60W 40/076
701/1

* cited by examiner

*Primary Examiner* — Lail A Kleinman
(74) *Attorney, Agent, or Firm* — William C. Lin, PLC

(57) ABSTRACT

A road slope estimation system providing road grade information for vehicle automatic parking assist system includes synchronized filters for processing vehicle speed differentiation to obtain vehicle acceleration to be compared with chassis accelerometer signal. Road grade information is extracted based on the comparison of the two signals. The system includes a dynamic compensator module to minimize the chassis accelerometer signal disturbance caused by chassis dynamic response to vehicle motion. The system further includes a predictive filter to obtain the steady-state filter result during the filter transient stage.

4 Claims, 19 Drawing Sheets

ROAD SLOPE ESTIMATION SYSTEM FOR AUTOMATIC PARKING ASSIST

FIELD

The present invention relates to vehicle motion control, and more particularly to automatic parking assist of a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In an automatic parking assistance maneuver, besides path planning for the vehicle, the controller needs to perform vehicle motion control along the planned path with necessary acceleration and deceleration controls. The acceleration is facilitated using engine torque control, and the deceleration is facilitated using brake control based on the desired vehicle target acceleration or deceleration level, and, inevitably, the gravitational force arising out of the road slope. In other words, the vehicle motion control during automatic parking maneuver requires knowledge of the three operating forces on the vehicle: The engine torque, the brake force and the slope of the road surface.

While information of engine torque and brake force can be obtained via respective controllers onboard the vehicle, slope of road surface is unavailable. Therefore, it is essential that information of the road slope be obtained for a satisfactory vehicle motion control during the automatic parking maneuver.

When the vehicle is equipped with a longitudinal chassis accelerometer, its signal may be applied for road slope estimation. In an ideal situation, when the vehicle is standing still on a slope, the longitudinal chassis accelerometer should provide the reading of slope in terms of an equivalent vehicle acceleration value on leveled ground. However, engineering issues may arise in various aspects when using a chassis longitudinal accelerometer:

First of all, the signal of a chassis accelerometer is naturally very noisy as it must be sensitive and responsive to the slightest motion of the vehicle, thus making the reading inevitably inaccurate; besides, the nature of noisy signal requires filtering which causes dynamic delay in the signal;

In addition, the vehicle is mostly in motion during the parking maneuver, and, therefore, dynamic delay in the filtered signal means delay of road-slope signal to the APA controller. This situation may not pose any problem when the road slope is fairly constant; however, challenge arises when the road slope is varying during the parking maneuver;

Moreover, while the chassis accelerometer is fixed in location and orientation with respect to vehicle chassis referenced to, say, the vehicle forward-moving direction, parking maneuvers require the vehicle to go in cycles of forward and reverse motion. As a result, the road slope, as perceived by the APA controller, will change sign even on the same spot when the transmission gear is changed from forward to reverse, and vice versa;

Furthermore, while the chassis accelerometer may provide accurate reading of road slope during its stand-still condition, the vehicle can hardly be operated in such condition during the automatic parking maneuver as it is constantly switching between forward and reverse gears with only very brief moment of standing still. The problem is made worse when the brief moment of standing still is compounded with the dynamic time delay of signal filtering that prevents the filter to reach the otherwise steady-state value of the road-slope information during the brief standing-still; and Last but not the least, the biggest challenge of road slope estimation is attributed to vehicle chassis dynamics, especially vehicle pitch motion arising out of vehicle acceleration and deceleration. This problem is especially significant when the vehicle suspension has lower stiffness.

Therefore, it is the objective to design and develop a system and a method as an integral part of the system to provide accurate and timely information of road surface slope for satisfactory controls of vehicle motion during automatic parking maneuver, especially taking into account the factors of soft vehicle suspension and situation of varying road slope.

SUMMARY

A road slope estimation system operating in conjunction with a vehicle automatic parking assist controller (APA controller) is disclosed. This system provides road slope information for the APA controller, and it includes a synchronized filter module in electrical signal communication with the APA controller. The synchronized filter module receives vehicle operation signals from the APA controller. These vehicle operation signals include a vehicle speed signal input and a chassis accelerometer signal input.

The road slope estimation system also includes a noise & disturbance rejection (NDR) filter module in electrical signal communication with the synchronized filter module. The NDR filter module receives a raw accelerometer offset signal from the synchronized filter module. The system also includes a dynamic compensator module in electrical signal communication with the NDR filter module. The dynamic compensator module generates a dynamic compensation signal to the NDR filter module.

The road slope estimation system also includes a braking condition monitor in electrical signal communication with the APA controller. The braking condition monitor receives braking signals from the APA controller. The braking signals include at least one of a vehicle brake pedal switch signal, an APA deceleration command signal, an APA normal brake command signal and an APA hard brake command signal. The system also includes a NDR filter operation status controller in electrical signal communication with the APA controller, the NDR filter module and the braking condition monitor. The NDR filter operation status controller generates a vehicle stand-still status signal and also generates a NDR filter status signal to the NDR filter module. The NDR filter operation status controller receives a brake activity status signal from the braking condition monitor;

The road slope estimation system also includes a slew rate adjustment module in electrical signal communication with the NDR filter module and the braking condition monitor. The slew rate adjustment module generates a slew rate adjustment reference signal to the NDR filter module and receives the brake activity status signal from the braking condition monitor. The system also includes a predictive road slope generator module in electrical signal communication with the APA controller, the NDR filter module and the NDR filter operation status controller. The predictive road slope generator module receives a NDR filter output signal from the NDR filter module and a vehicle stand-still status signal from the NDR filter operation status controller. It also generates a predictive road slope signal to the APA controller.

The road slope estimation system also includes a vehicle linear acceleration signal module in electrical signal communication with the APA controller, the NDR filter module, the dynamic compensator module and the NDR filter operation status controller. The vehicle linear acceleration signal module receives a filtered compensated accelerometer offset signal from the NDR filter module. It generates a vehicle linear acceleration signal to the dynamic compensator module. This module also receives the vehicle stand-still status signal from the NDR filter operation status controller, and generates a vehicle linear acceleration signal for APA controller to the APA controller.

In this system a vehicle motion direction signal module is also included. This module is in electrical signal communication with the APA controller, the NDR filter module, the predictive road slope generator module and the vehicle linear acceleration signal module. The vehicle motion direction signal module receives a vehicle transmission gear status signal from the APA controller and generates a vehicle motion direction signal to the NDR filter module, the predictive road slope generator module and the vehicle linear acceleration signal module.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. It should be understood that steps within a method may be executed in different order without altering the principles of the present disclosure unless otherwise specified.

As used herein, the term module may refer to an electronic circuit, a processor (shared, dedicated, or group) and memory that execute one or more software or firmware programs, a combinational logic circuit, and/or other suitable components that provide the described functionality.

Figure 1:
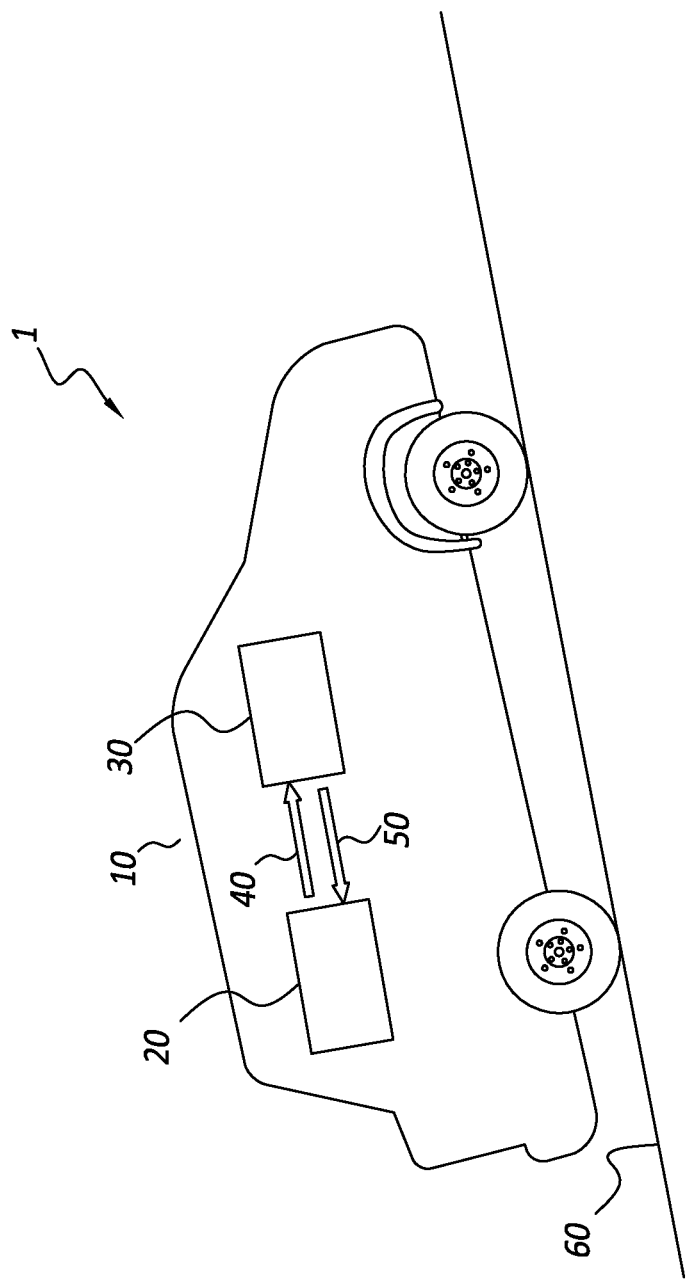
FIG. 1 is an illustration of a vehicle system equipped with automatic parking assist system and a road slope estimation system according to the principle of the present invention.

Referring to FIG. 1 an illustration of a vehicle system 1 is shown. The vehicle system 1 includes an Automatic Parking Assist (APA) controller 20 and a road slope estimation system (RSES) 30 equipped in a vehicle 10 performing an automatic parking assist maneuver on a road 60 with certain degree of road slope. The APA controller 20 and RSES 30 are in electrical communication with each other. The APA controller 20 sends a set of signals 40 to RSES 30 and the RSES 30 sends a set of signals 50 to APA controller 20 in coordination of the automatic parking assist maneuver.

Figure 2:
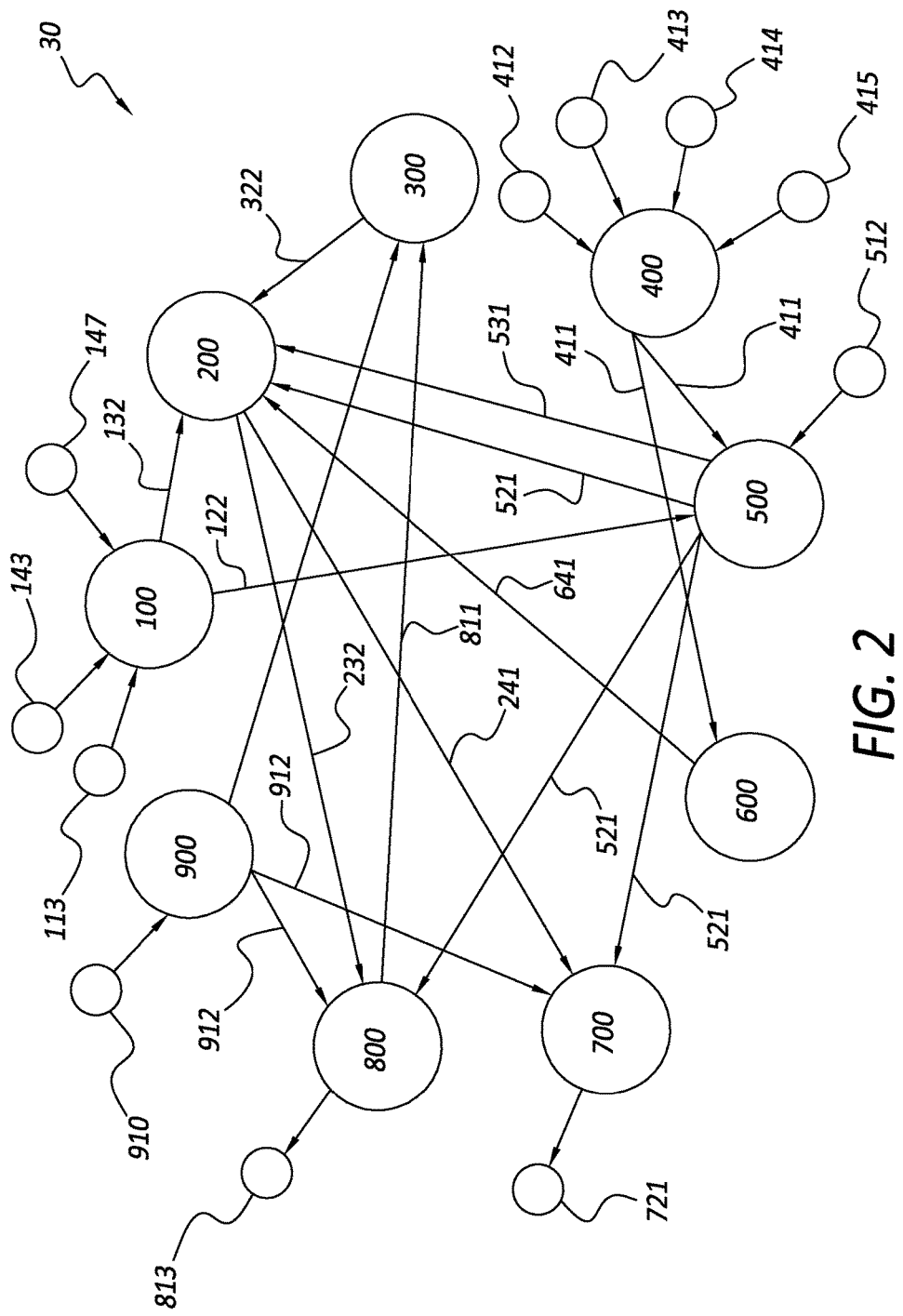
FIG. 2 is an architectural diagram of the road slope estimation system according to the principle of present invention.

Referring to FIG. 2 an architectural diagram of the road slope estimation system (RSES) 30 is shown. The RSES 30 may include a synchronized filter module 100, a noise & disturbance rejection (NDR) filter module 200, a dynamic compensator module 300, a braking condition monitor 400, a NDR filter operation status controller 500, a slew rate adjustment module 600, a predictive road slope generator module 700, a vehicle linear acceleration signal module 800 and a vehicle motion direction signal module 900. These modules may receive various vehicle signals and parking maneuver control signals from the APA controller. One or more of these modules may generate and provide signals related to road slope information for the APA controller. Each of these modules may be in electrical communication with one or more of the other modules to via various signals to send and receive relevant information for estimation of the road slope.

Figure 3:
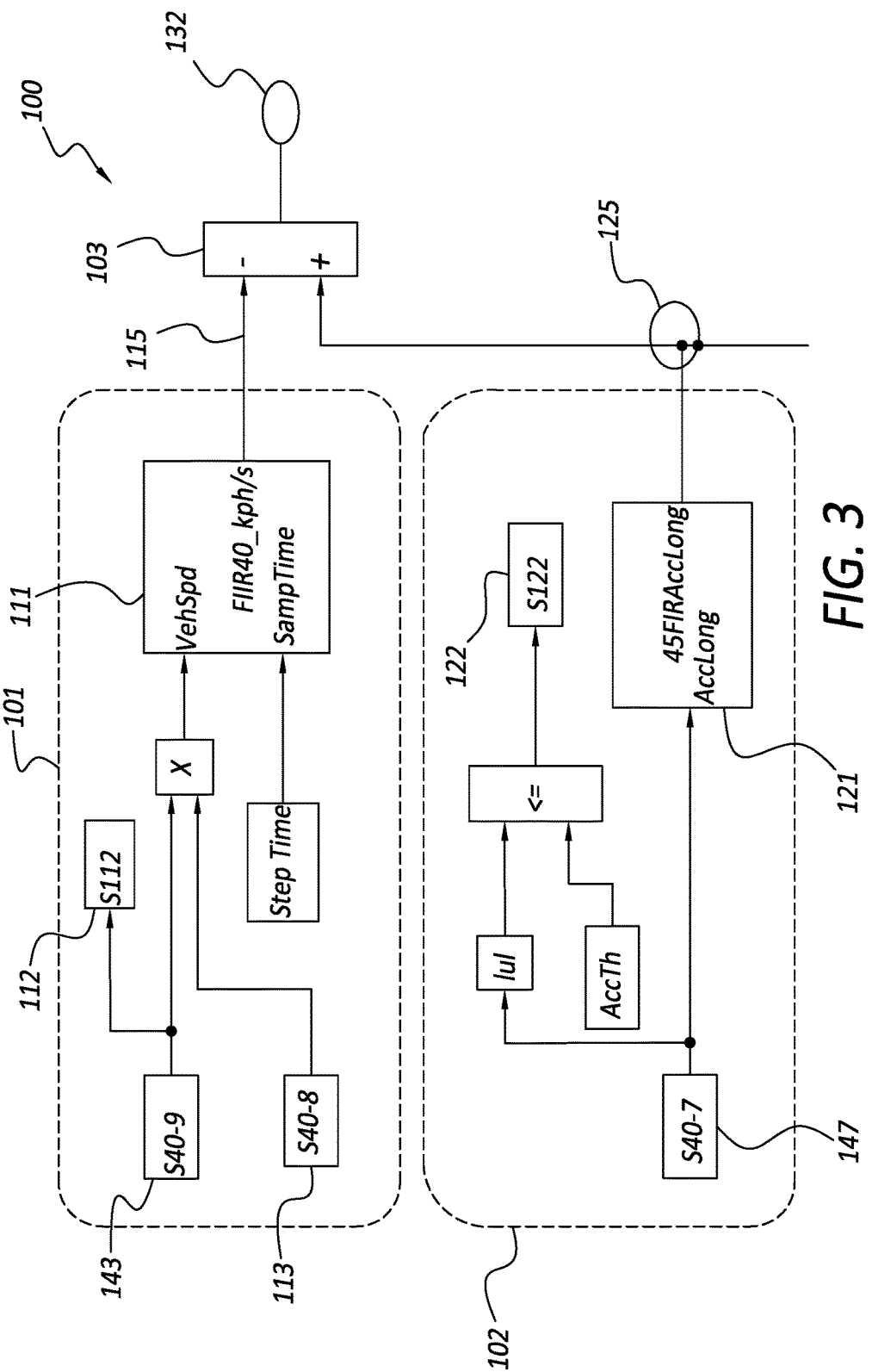
FIG. 3 is a schematic diagram of a synchronized filter module for the road slope estimation system according to the principle of the present invention.

Referring now to FIG. 3 a schematic diagram of the synchronized filter module 100 is shown. The synchronized filter module 100 may include a speed derivative processing filter 101 for obtaining a vehicle acceleration information based on vehicle speed signal, and a chassis accelerometer processing filter 102 for obtaining another vehicle acceleration information based on vehicle chassis accelerometer signal. The speed derivative processing filter 101 may receive a vehicle speed signal input 143 and a vehicle direction indicator input 113 as input signal and generates a speed-derivative acceleration signal 115 as output signal. The chassis accelerometer processing filter 102 may receive a chassis accelerometer signal input 147 as input signal and generates an accelerometer-based acceleration signal 125 as output signal. The speed derivative processing filter 101 may generate a vehicle speed signal 112 for various modules in the RSES 30. The chassis accelerometer processing filter 102 may generate a acceleration status indicator signal 122 for various modules in the RSES 30.

The speed derivative processing filter 101 may include a speed signal differentiation FIR filter 111, and the chassis accelerometer processing filter 102 may include an accelerometer signal FIR filter 121. The speed signal differentiation FIR filter 111 may include a speed signal differentiation FIR filter that generates the speed-derivative acceleration signal 115, and the accelerometer signal FIR filter 121 may include an accelerometer signal FIR filter that generates the accelerometer-based acceleration signal 125. The speed signal differentiation FIR filter and the accelerometer signal FIR filter are designed in such way that their respective filter responses possess the same group delay in the signal processing so that the speed-derivative acceleration signal 115 and the accelerometer-based acceleration signal 125 are synchronized. The synchronized filter module 100 may also include an accelerometer offset signal module 103 to generate a raw accelerometer offset signal 132 as its output signal by taking a difference between the two signals of speed-derivative acceleration signal 115 and accelerometer-based acceleration signal 125.

Figure 4:
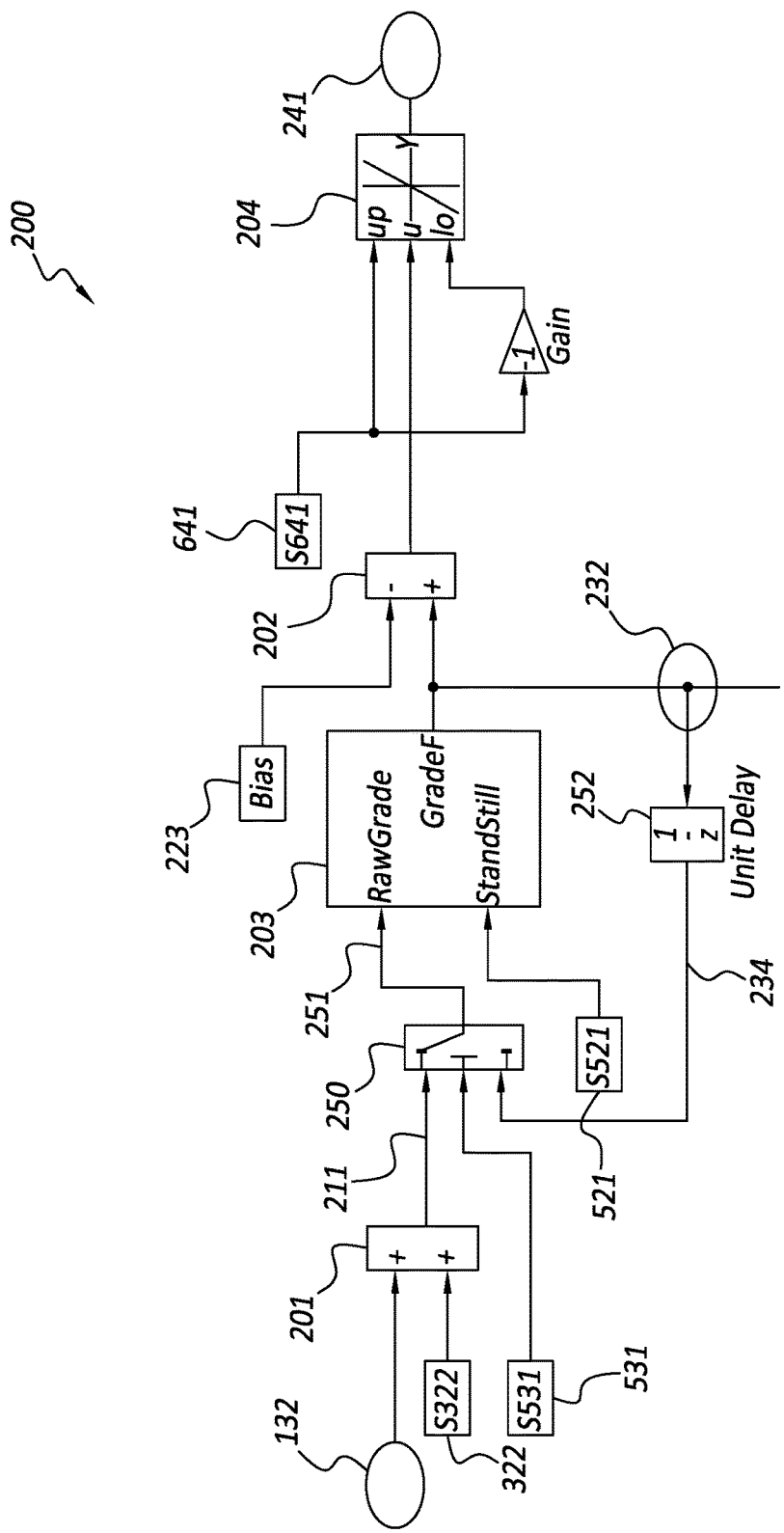
FIG. 4 is a schematic diagram of a noise & disturbance rejection (NDR) filter module for the road slope estimation system according to the principle of the present invention.

Referring now to FIG. 4 a schematic diagram of a noise & disturbance rejection (NDR) filter module 200 is shown. The NDR filter module 200 processes the raw accelerometer offset signal 132 to filter out the noise and disturbance signals carried with the raw accelerometer offset signal 132. The NDR filter module 200 may include an accelerometer dynamic compensation module 201 which takes a dynamic compensation signal 322 and the raw accelerometer offset signal 132 as input signals to generate a compensated accelerometer offset signal 211 as output signal. The compensated accelerometer offset signal 211 may be sent to down-stream filtering system modules for further process.

The NDR filter module 200 may include a NDR low pass filter 203 to filter out noise in the signals and generates a filtered compensated accelerometer offset signal 232. The NDR filter module 200 may include a signal delay unit 252 to generate a delayed filtered output signal 234 from the filtered compensated accelerometer offset signal 232. The NDR filter module 200 may also include a NDR filter control switch module 250 to provide input signal to the NDR low pass filter 203. The NDR filter control switch module 250 may take a NDR filter status signal 531 to determine whether the input signal to the NDR low pass filter 203 should be the compensated accelerometer offset signal 211 or the delayed filtered output signal 234 based a state of the NDR filter status signal 531. When the NDR filter status signal 531 is of ACTIVE state, the compensated accelerometer offset signal 211 is used as input signal to the NDR low pass filter 203. When the NDR filter status signal 531 is of INACTIVE state, the delayed filtered output signal 234 is used as input signal to the NDR low pass filter 203 rendering the NDR filter inactive. The NDR low pass filter 203 filtering process may also be based on a vehicle stand-still status signal 521 indicating whether vehicle is in a standing-still state. The NDR filter module 200 may also include an accelerometer bias removal module 202 to remove the accelerometer bias signal 223 from the filtered compensated accelerometer offset signal 232.

The NDR filter module 200 may also include a slew rate control module 204 to limit the slew rate of the signal since practically the road slope information should be of slow-changing nature during a parking maneuver. The slew rate control module 204 may operate based on a slew rate adjustment reference signal 641 provided based on attending circumstances of the parking maneuver. The NDR filter module 200 may generate a NDR filter output signal 241 for one or more of the modules of RSES 30 for further process.

Figure 5:
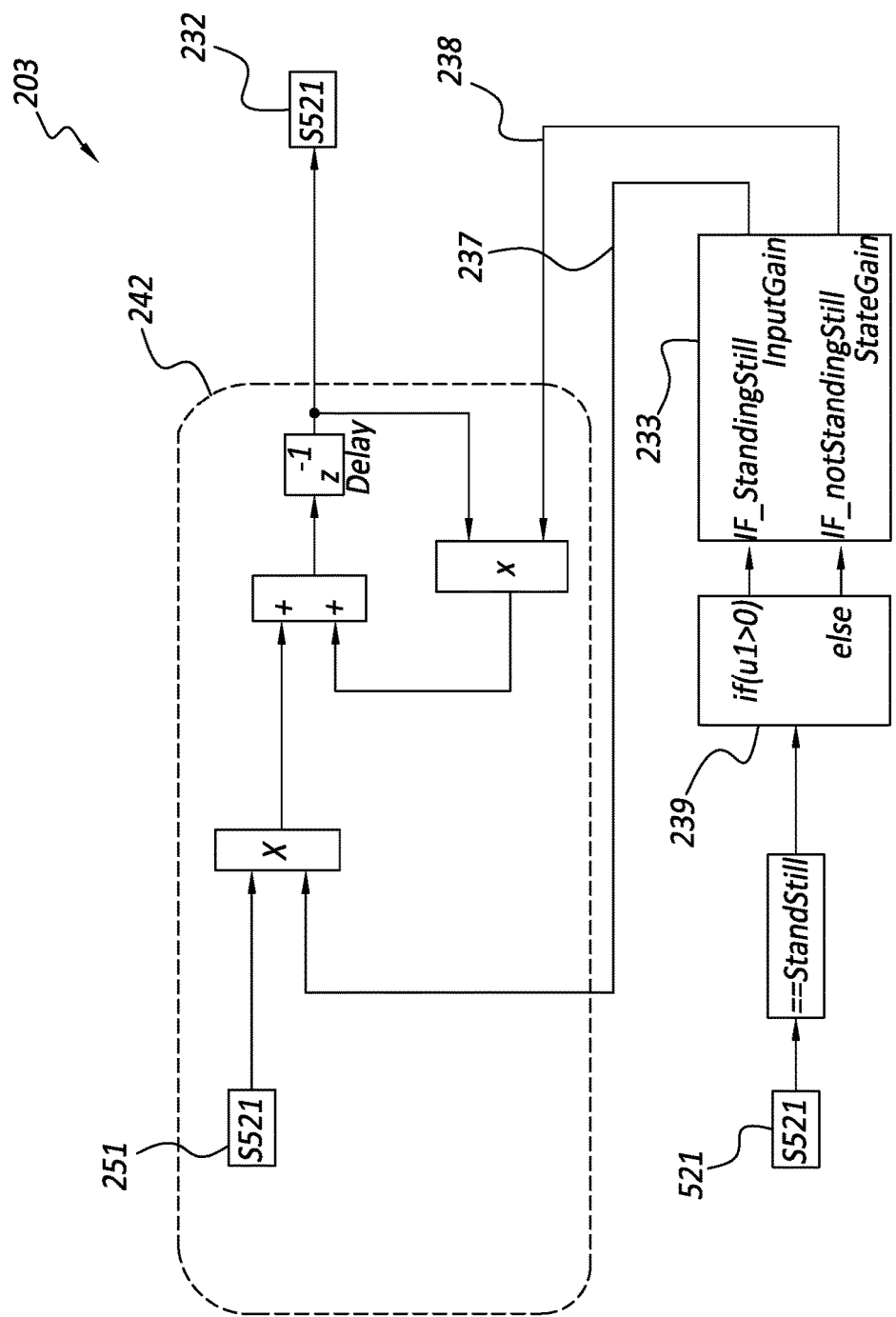
FIG. 5 is a schematic diagram of a NDR low pass filter for the road slope estimation system according to the principle of the present invention.

Referring now to FIG. 5 a schematic diagram of the NDR low pass filter 203 is shown. The NDR low pass filter 203 may include a low pass filter module 242 to filter out the noise contained in the NDR filter input signal 251 and generate a filtered compensated accelerometer offset signal 232 for one or more of modules of the RSES 30. The NDR low pass filter 203 may include a stand-still status monitor 239 to monitor the vehicle stand-still status signal 521, and a filter gains module 233 to generate a filter input gain signal 237 and a filter state gain signal 238 for execution of low-pass filtering based on the monitoring result of the stand-still status monitor 239.

Figure 6:
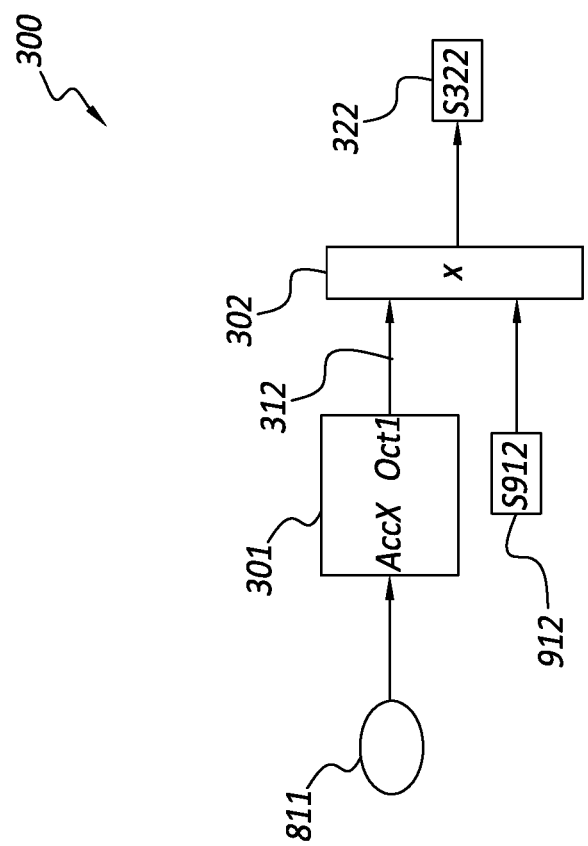
FIG. 6 is a schematic diagram of a dynamic compensator module for the road slope estimation system according to the principle of the present invention.

Referring now to FIG. 6 a schematic diagram of the dynamic compensator module 300 is shown. The dynamic compensator module 300 generates the dynamic compensation signal 322 for one or more of the modules of the RSES 30 based on a vehicle linear acceleration signal 811 and a vehicle motion direction signal 912. The dynamic compensator module 300 may include a compensation signal generation module 301 which generates a linear acceleration compensation signal 312, and a motion direction adjustment module 302 which generates the dynamic compensation signal 322 based on the linear acceleration compensation signal 312 and the vehicle motion direction signal 912 by appending appropriate sign to the linear acceleration compensation signal 312 based on the indication of forward or reverse motion of the vehicle represented in the vehicle motion direction signal 912.

Figure 7:
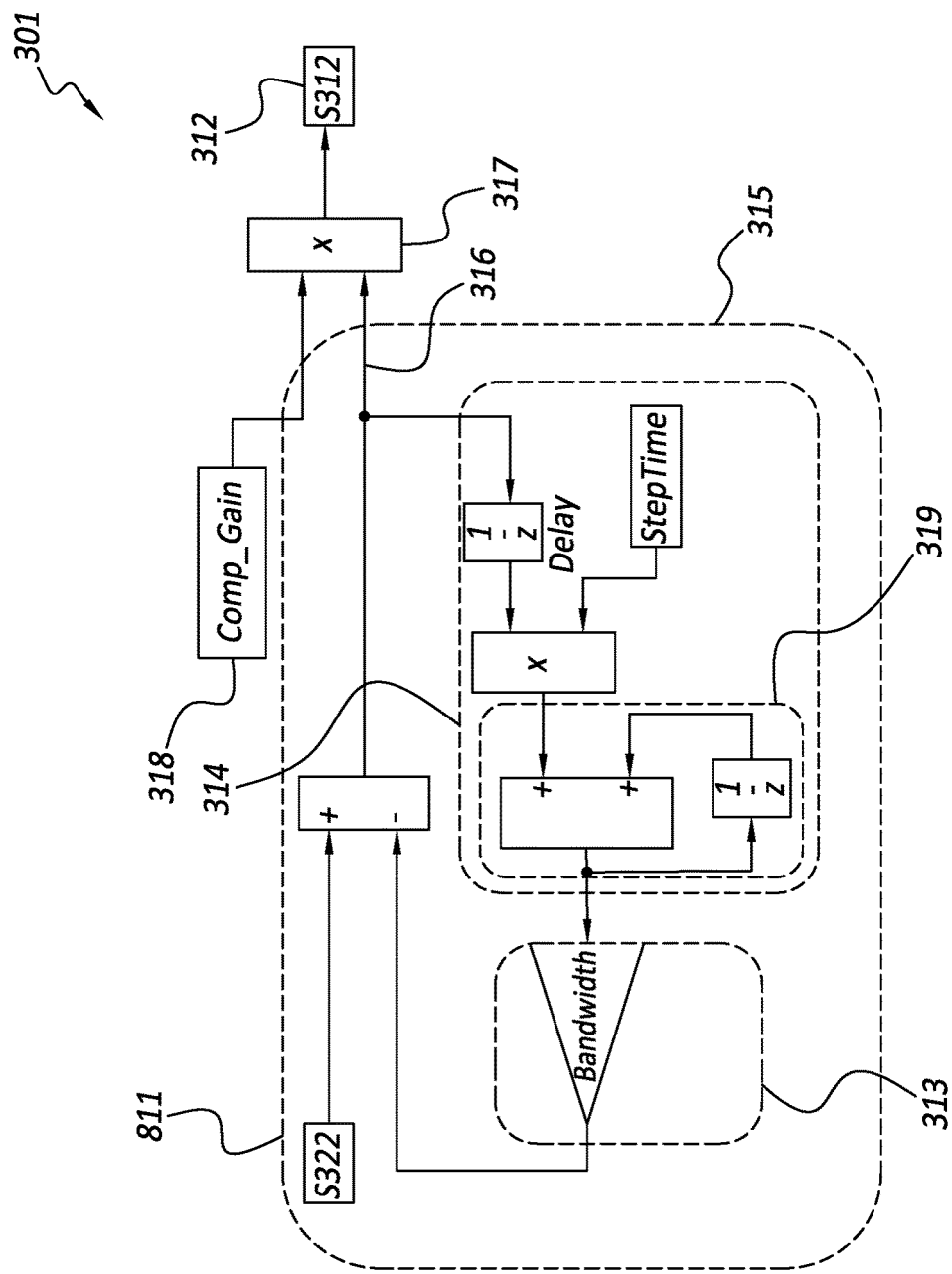
FIG. 7 is a schematic diagram of a compensation signal generation module for the road slope estimation system according to the principle of the present invention.

Referring now to FIG. 7 a schematic diagram of the compensation signal generation module 301 is shown. The compensation signal generation module 301 may include a base compensation signal generator module 315 which receives the vehicle linear acceleration signal 811 and generates a base compensation signal 316. The compensation signal generation module 301 may also include a compensation amplitude adjustment module 317 which, in turn, generates the linear acceleration compensation signal 312 based on a predetermined amplitude adjustment gain 318 by computing for a multiplication product of the base compensation signal 316 and the amplitude adjustment gain 318.

The principle of compensation signal generation module 301 is based on a vehicle chassis dynamic phenomenon that vehicle pitching motion can result in a disturbance signal to contaminate vehicle linear accelerometer resulting in signal distortion. In-depth analysis of the relationship between vehicle pitch motion and vehicle linear accelerometer signal leads to a conclusion that it is the disturbance has significant correlation with vehicle linear acceleration or deceleration. Therefore, in order to resolve such disturbance issue, time derivative of chassis accelerometer may be applied to the signal processing to alleviate the problem.

The base compensation signal generator module 315 may include a differentiation module 314 for generating a time derivative of the vehicle linear acceleration signal 811. While the signal of vehicle chassis accelerometer is inherently noisy, any attempt to obtain time derivative of such signal by taking time-based differentiation of such signal will inevitably result in more noise beyond recognition. Therefore, one preferred embodiment of the differentiation module 314 according to this invention is to implement the differentiation module 314 without taking time-based difference of the vehicle linear acceleration signals 811. In the differentiation module 314 only an accumulator 319, or equivalently, an integrator (not shown) is used for the implementation. The base compensation signal generator module 315 may also include a bandwidth control module 313 to determine a bandwidth of low-pass filtering effect on the time-derivative signal processed in differentiation module 314.

Figure 8:
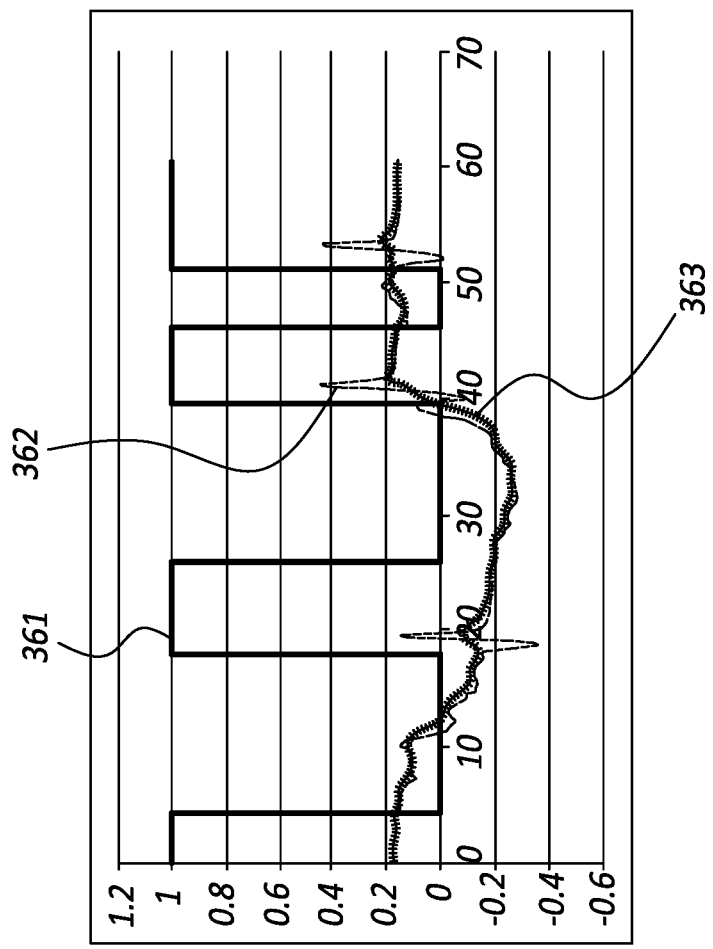
FIG. 8 is a graphical illustration of the result of the dynamic compensator module according to the principle of the present invention.

Referring now to FIG. 8 a graphical illustration of the result of the dynamic compensator module 300 is shown. The result shows, during the time period where vehicle braking is active as indicated by a brake-active signal 361, the uncompensated signal 362 is significantly distorted by chassis dynamic disturbance. With the implementation of the dynamic compensator according to this invention, the disturbance is significantly reduced as indicated in the compensated signal 363.

Figure 9:
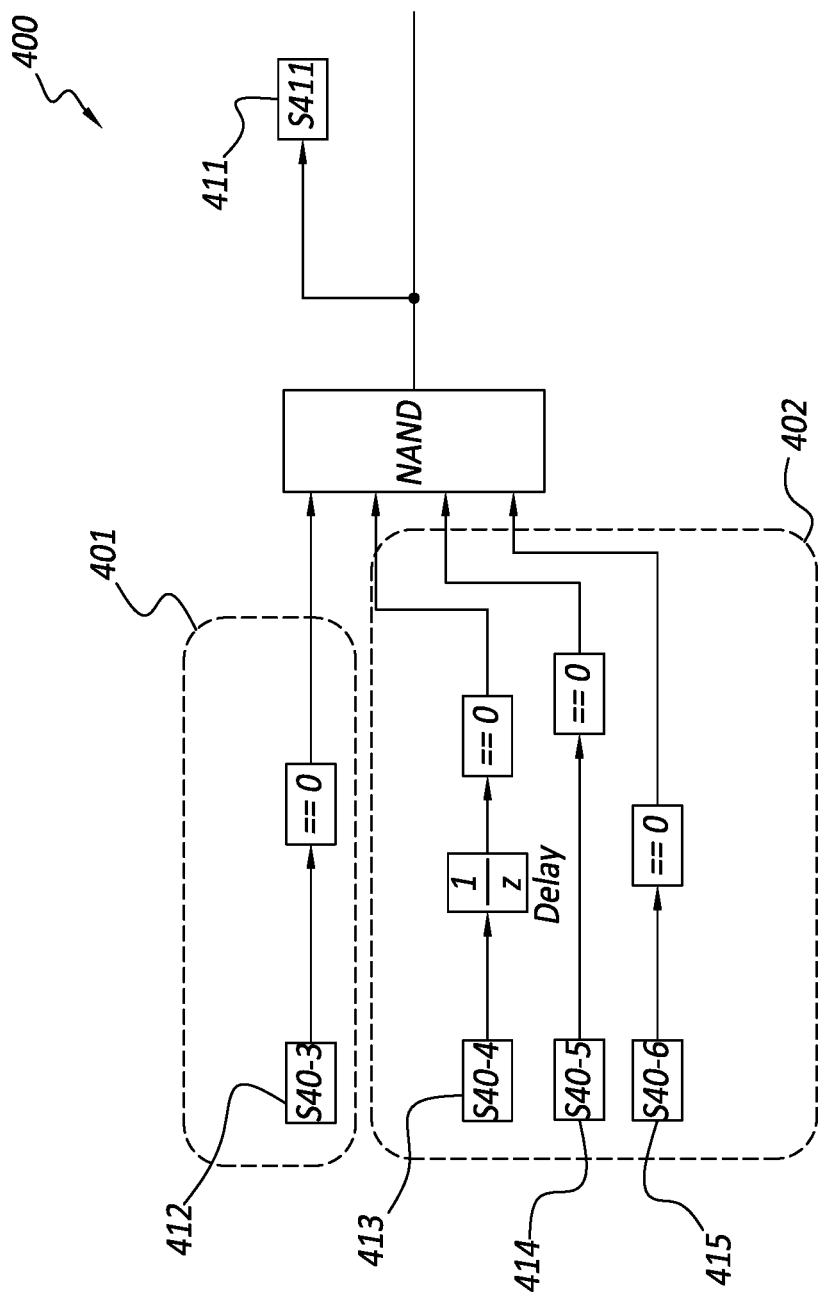
FIG. 9 is a schematic diagram of a braking condition monitor for the road slope estimation system according to the principle of the present invention.

Referring now to FIG. 9 a schematic diagram of the braking condition monitor 400 is shown. The braking condition monitor 400 may include a brake pedal monitor 401 to monitor the braking activity from activation of the vehicle brake pedal via a vehicle brake pedal switch signal 412. The braking condition monitor 400 may also include an APA brake actuation monitor 402 to monitor the braking activities initiated by the APA controller 20 during the automatic parking maneuver. For example, the APA controller 20 may issue an APA deceleration command signal 413, an APA normal brake command signal 414 or an APA hard brake command signal 415 depending on the need of certain parking maneuvers. The braking condition monitor 400 may generate a brake activity status signal 411 based on the brake pedal activity or APA controller braking activity.

Figure 10:
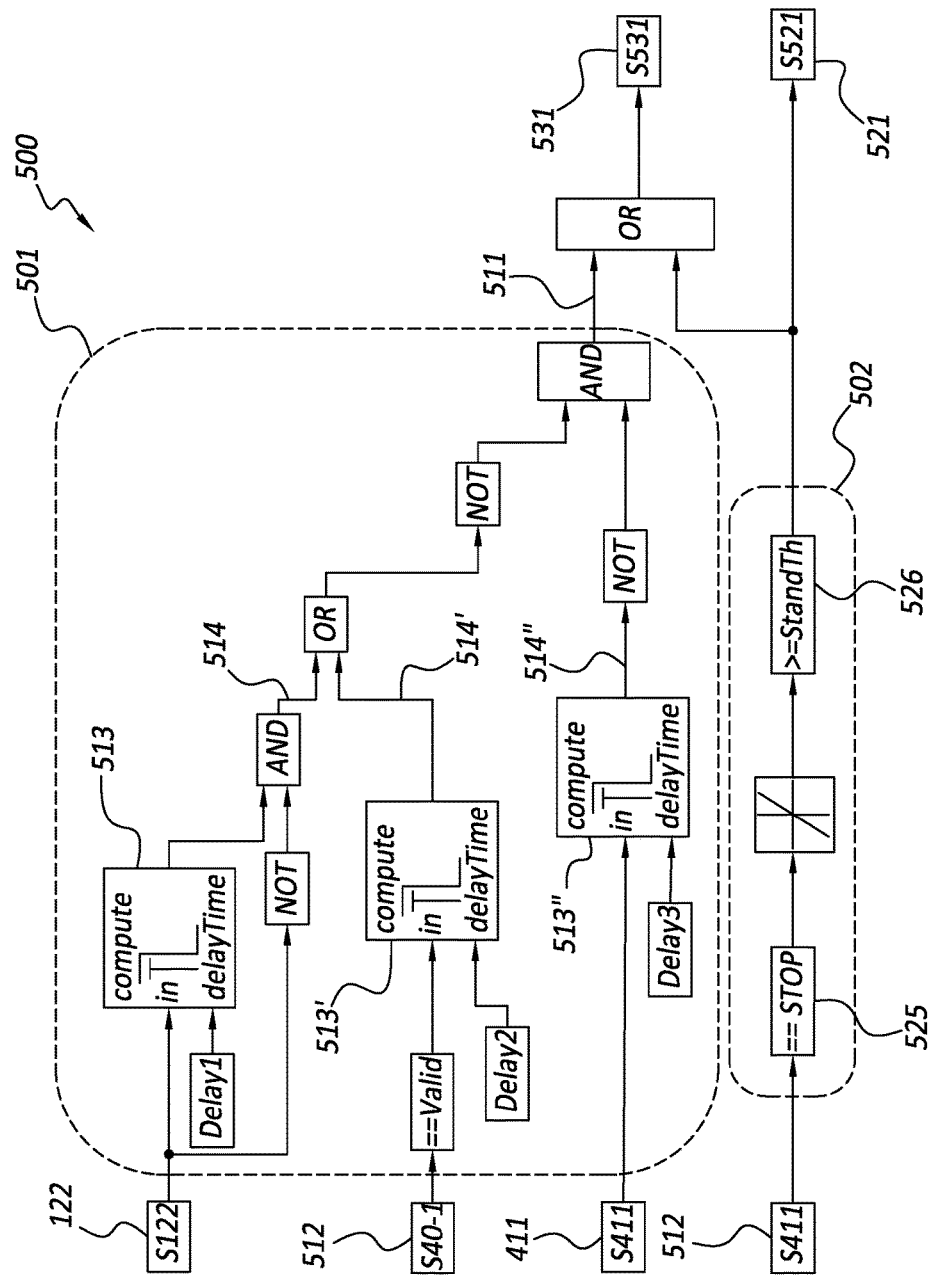
FIG. 10 is a schematic diagram of a NDR filter operation status controller for the road slope estimation system according to the principle of the present invention.

Referring now to FIG. 10 a schematic diagram of the NDR filter operation status controller 500 is shown. The NDR filter operation status controller 500 may include a vehicle-activity-based status monitor module 501 to determine the NDR filter operation status based on vehicle activities. The NDR filter operation status controller 500 may also include a vehicle-standing-based status monitor module 502 to determine the NDR filter operation status based on a vehicle standing-still condition. The vehicle-activity-based status monitor module 501 may generate a vehicle-activity-based status signal 511, the vehicle-standing-based status monitor module 502 may generate a vehicle stand-still status signal 521. The NDR filter operation status controller 500 may generate a NDR filter status signal 531 based on a logical OR operation of the vehicle-activity-based status signal 511 and the vehicle stand-still status signal 521. The vehicle stand-still status signal 521 may be made available for one or more of the modules of the RSES 30.

The vehicle-activity-based status monitor module 501 may receive the acceleration status indicator signal 122, the brake activity status signal 411 and a wheel rotation sensor signal 512 as input signals. The vehicle-activity-based status monitor module 501 may include one or more of a delay signal generator 513 which delays the input signal to the vehicle-activity-based status monitor module 501 so as to generate a delayed vehicle-activity signal 514. Such delayed signal will cause the NDR filter to be inactive while vehicle dynamic activities is underway, and wait for a pre-determined period of time during the delay to allow vehicle dynamic behavior to settle without creating undesirable disturbance to the slope estimation.

The vehicle-standing-based status monitor module 502 may include a wheel-stopped detection module 525 to detect a vehicle standing-still condition based on the wheel rotation sensor signal 512. A steady-state condition of vehicle standing-still may be detected by a wheel-stopped steady-state detection module 526.

Figure 11:
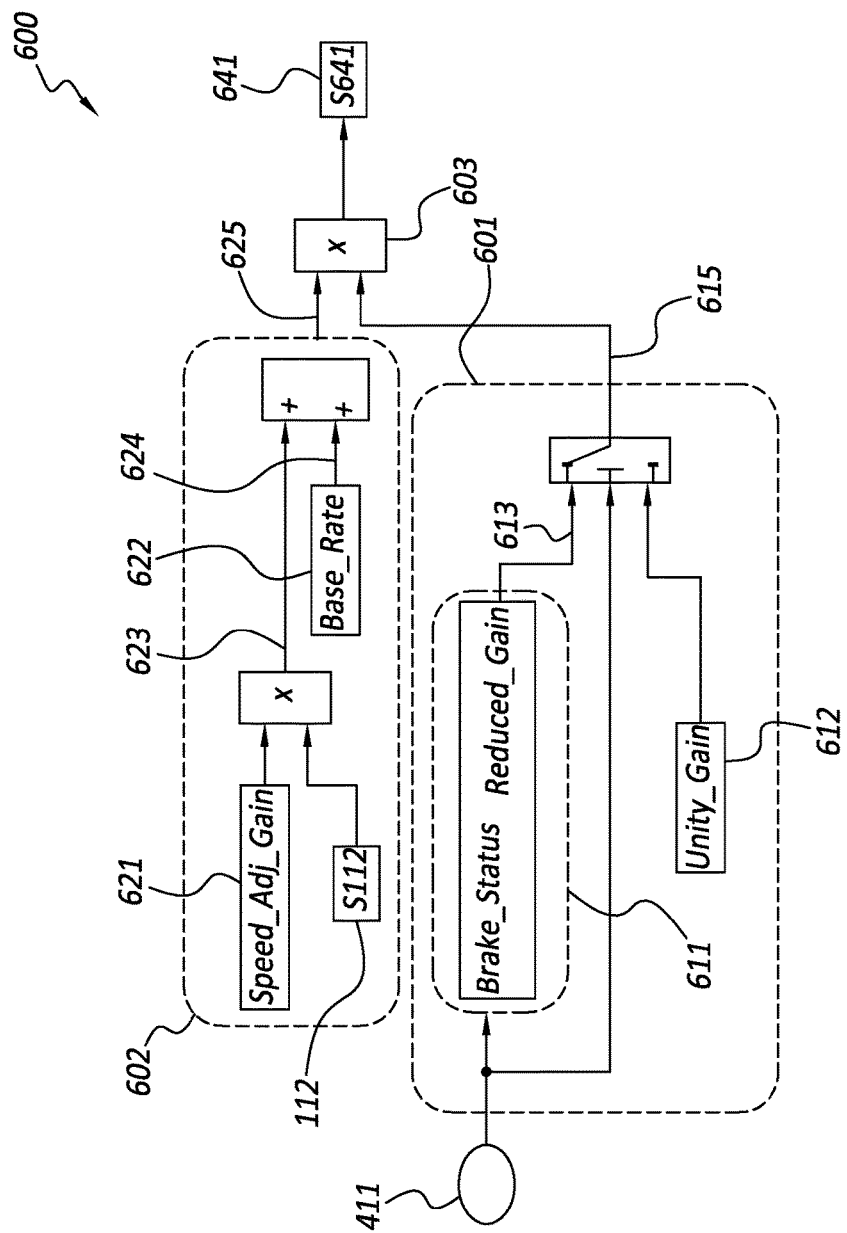
FIG. 11 is a schematic diagram of a slew rate adjustment module for the road slope estimation system according to the principle of the present invention.

Referring now to FIG. 11 a schematic diagram of the slew rate adjustment module 600 is shown. In one embodiment of the present invention, the slew rate of the road slope signal may be determined based on vehicle speed as well as based on vehicle braking activity. The slew rate adjustment module 600 may include a vehicle-braking-based slew rate adjustment module 601 to determine the road slope signal slew rate based on vehicle braking activity. The slew rate adjustment module 600 may include a vehicle-speed-based slew rate adjustment module 602 to determine the road slope signal slew rate based on vehicle speed.

The vehicle-braking-based slew rate adjustment module 601 may receive the brake activity status signal 411 and generates a vehicle-braking-based slew rate multiplier signal 615. The vehicle-braking-based slew rate adjustment module 601 may include a slew-rate multiplier generator 611 which generates a predetermined slew rate multiplier based on braking 613. The vehicle-braking-based slew rate adjustment module 601 may generate the vehicle-braking-based slew rate multiplier signal 615 based on predetermined slew rate multiplier based on braking 613 when there is a braking activity indicated by the brake activity status signal 411, otherwise the vehicle-braking-based slew rate adjustment module 601 may generate the vehicle-braking-based slew rate multiplier signal 615 based on a unity gain 612.

Figure 12:
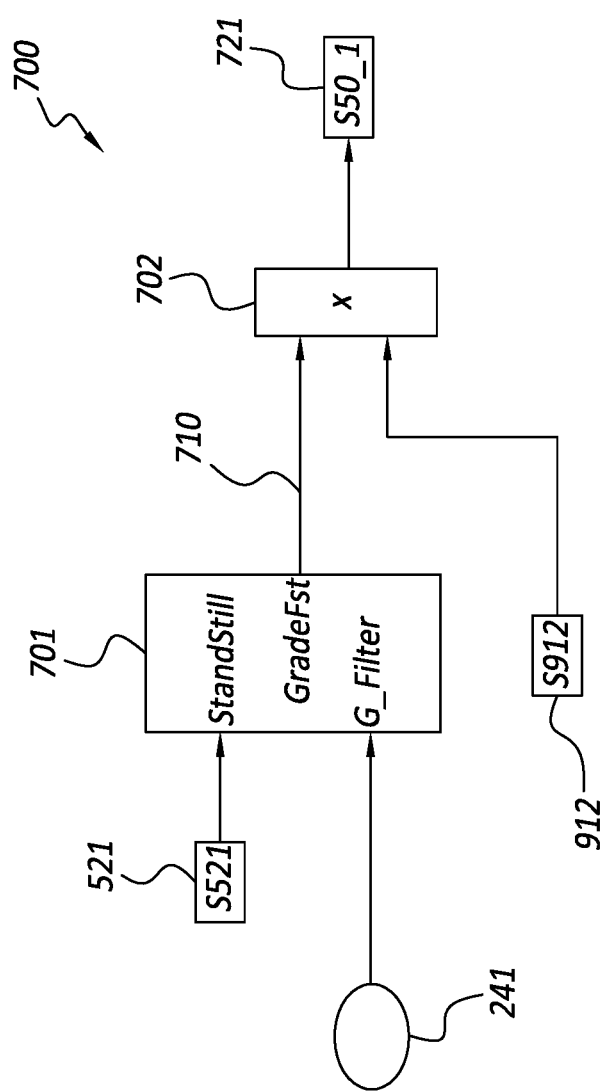
FIG. 12 is a schematic diagram of a predictive road slope generator module for the road slope estimation system according to the principle of the present invention.

Referring now to FIG. 12 a schematic diagram of the predictive road slope generator module 700 is shown. The predictive road slope generator module 700 may receive the vehicle stand-still status signal 521 and the NDR filter output signal 241 as input signals, and generate a predictive road slope signal 721 for one or more of the modules of the RSES 30. The predictive road slope generator module 700 may include a predictive filter module 701 which generates a predictive road grade signal 710. The predictive road slope signal 721 may be generated based on the predictive road grade signal 710 and the vehicle motion direction signal 912 by a road slope generator module 702 which makes proper sign adjustment of the predictive road grade signal 710 based on the vehicle motion direction signal 912.

Figure 13:
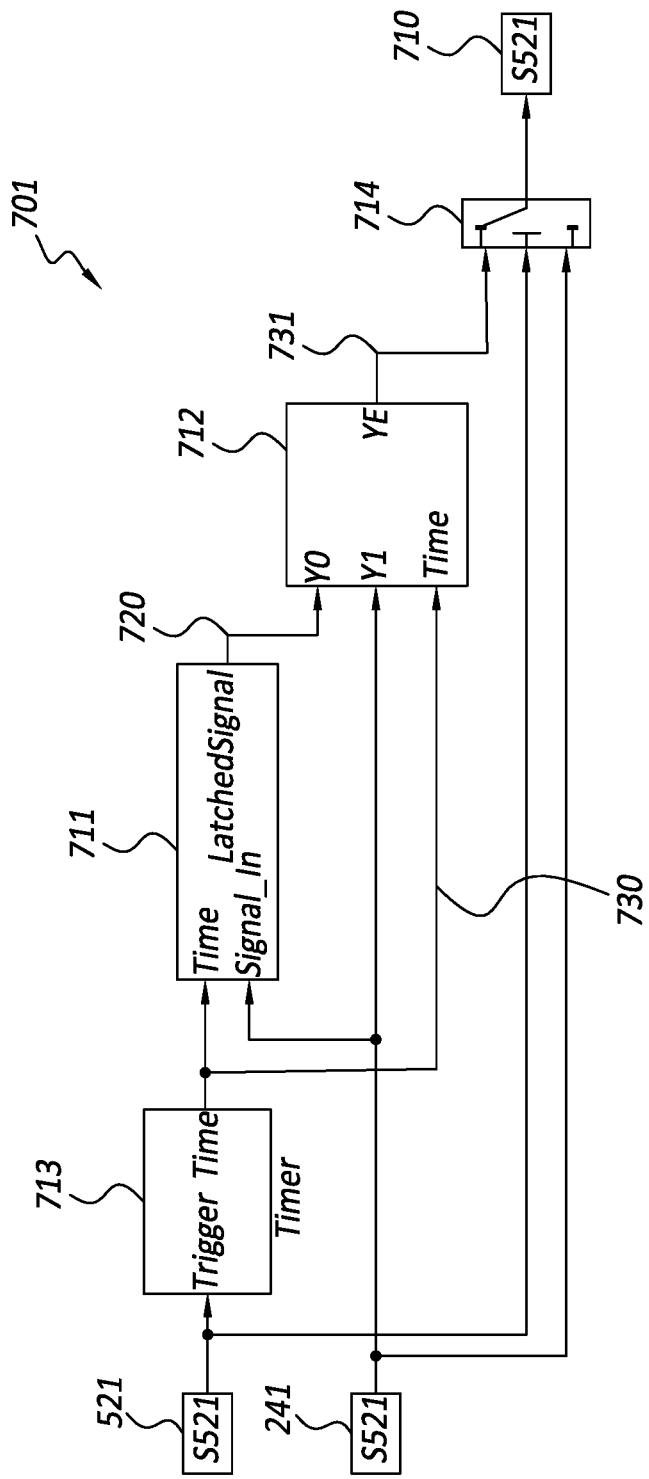
FIG. 13 is a schematic diagram of a predictive filter module for the road slope estimation system according to the principle of the present invention.

Referring now to FIG. 13 a schematic diagram of the predictive filter module 701 is shown. The predictive filter module 701 may include an initial signal latch module 711, a predictive signal generator module 712 and a timer module 713. The timer module 713 is controlled by the vehicle stand-still status signal 521, the vehicle stand-still status signal 521, in turn, also controls a filter signal selection module 714 to determine selection of signals for the predictive road grade signal 710. The timer module 713 may generate timer clock signal 730 for the initial signal latch module 711 and the predictive signal generator module 712. The initial signal latch module 711 may generate a latched initial signal 720 based on the NDR filter output signal 241 and the timer clock signal 730. The predictive signal generator module 712 may generate a predictive filter signal 731 based on the latched initial signal 720, the NDR filter output signal 241 and the timer clock signal 730.

Figure 14:
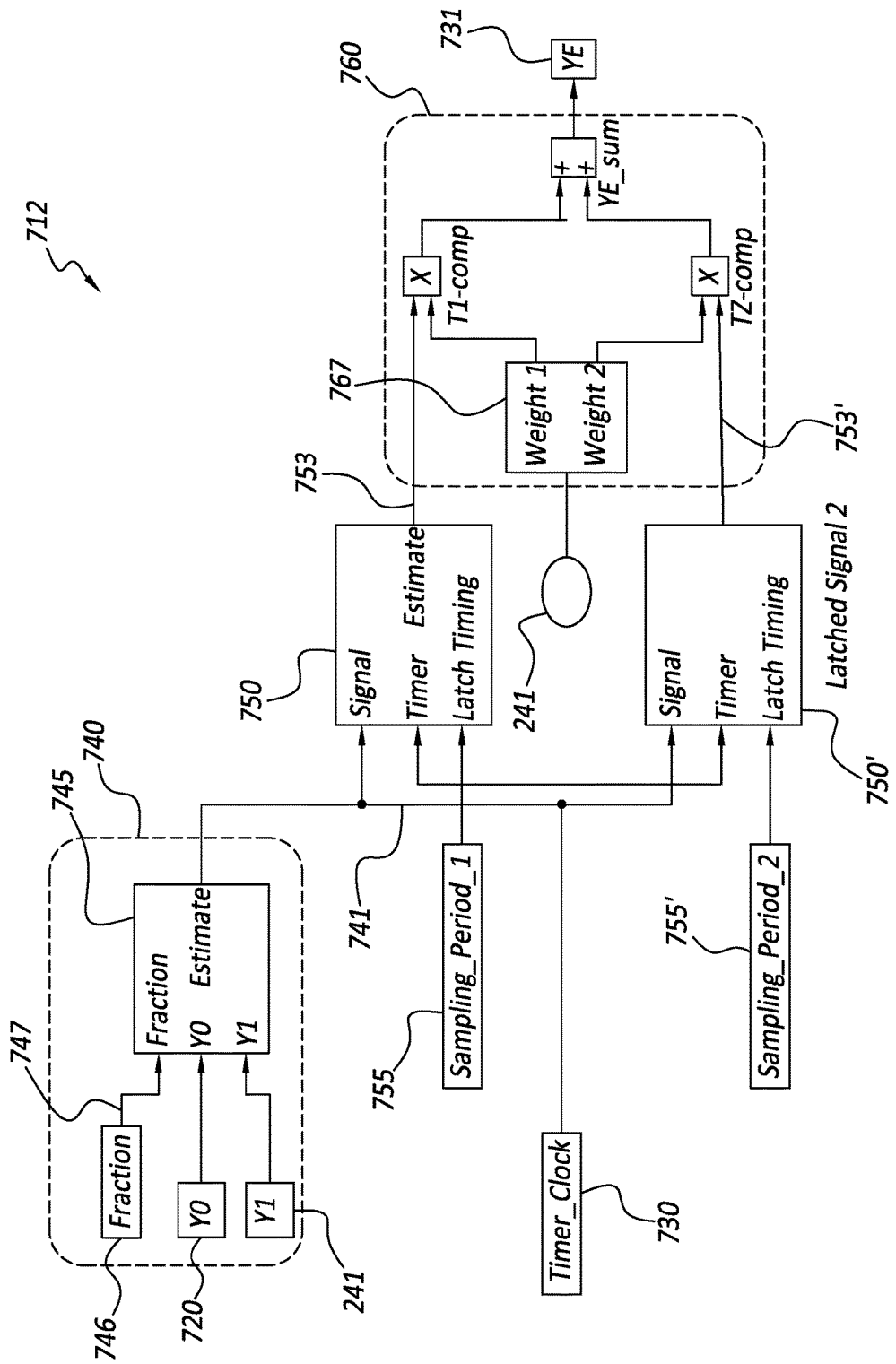
FIG. 14 is a schematic diagram of a predictive signal generator module for the road slope estimation system according to the principle of the present invention.

Referring now to FIG. 14 a schematic diagram of the predictive signal generator module 712 is shown. The predictive signal generator module 712 may include a steady-state prediction generator 740, a predictive steady-state signal latch 750 and a latched predictions aggregation module 760. The steady-state prediction generator 740 may include a filter steady-state estimation module 745 which generates a steady-state prediction signal 741 based on the latched initial signal 720, the NDR filter output signal 241 and a filter characteristic parameter generator 746. The filter characteristic parameter generator 746 generates a filter characteristic ratio 747 based on characteristics of the NDR filter 200. The value of filter characteristic ratio 747 may be predetermined and stored in the filter characteristic parameter generator 746 for retrieval as needed.

The value of filter characteristic ratio 747 may be determined using a process described as follows:
(1) Excite the NDR filter 200 with a step input of amplitude A from a zero initial condition;
(2) At a predetermined timing ΔT after the step input, measure the step response, Y, of the NDR filter 200;
(3) Determine a filter characteristic ratio R=A/Y.

Based on the filter characteristic identified according to the present invention, steady-state response of the NDR filter 200 can be predicted before the steady-state condition is ever reached by the following process:
(1) At time T0 get a first latched value Y0 of the NDR filter output signal 241;
(2) At time T1=T0+ΔT get a second latched value Y1 of the NDR filter output signal 241;
(3) A steady-state value YE of the NDR filter 200 is estimated and latched at time T1 based on $$YE=Y0+(Y1-Y0)*R.$$

The predictive signal generator module 712 may include a predictive latch timing generator 755 to generate the latch timing T1 based on the measure of the timer clock signal 730 so the latched steady-state prediction signal 753 may be generated before a steady-state condition is reached.

In one embodiment the predictive signal generator module 712 may include more than one predictive steady-state signal latch 750. Additional estimation of the NDR filter steady state may be performed at a timing T1' that is different from T1. The latched predictions aggregation module 760 may receive more than one latched steady-state prediction signal 753 to generate the predictive filter signal 731. The latched predictions aggregation module 760 may include a signal weight generator 767 to provide weighting factors among the various signals of latched steady-state prediction signal 753 to form the predictive filter signal 731 based on aggregation of the various inputs of latched steady-state prediction signal 753.

Figure 15:
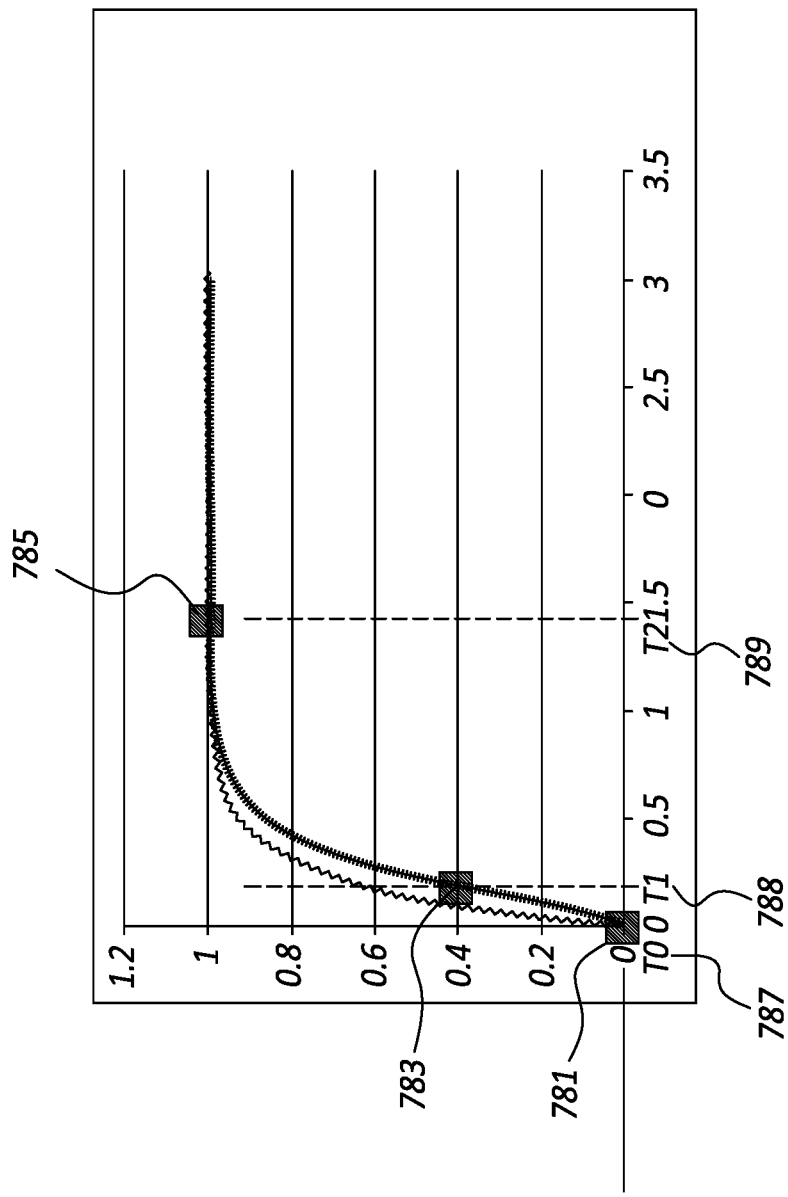
FIG. 15 is a graphical illustration of the operating principle for the predictive filter module according to the principle of the present invention.
Figure 16:
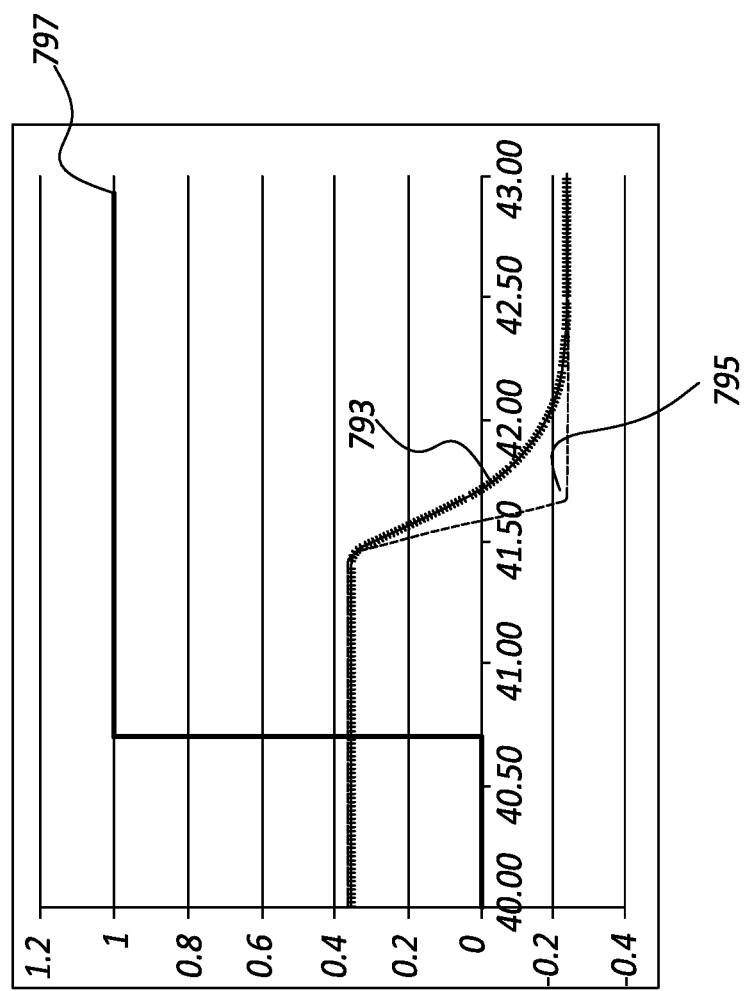
FIG. 16 is a graphical illustration of the result of the predictive road slope generator module according to the principle of the present invention.

Referring now to FIG. 15 a graphical illustration of the operating principle for the predictive filter module 701 is shown. At the filter start timing 787 (T0) the filter input has an initial value 781 which may or may not be zero. The filter is expected to reach a steady state 785 after a timing 789 (T2). However, the steady-state value can be estimated at a timing 788 (T1) during its transient response 783 before the steady state 785 is reached according to the present invention. Actual test data shows the effectiveness of the predictive filter module 701 as illustrated in FIG. 16 where the predictive filter response 795 is shown to have the predictive effect over the regular low pass filter response 793 under the condition of a vehicle stand-still condition 797.

Figure 17:
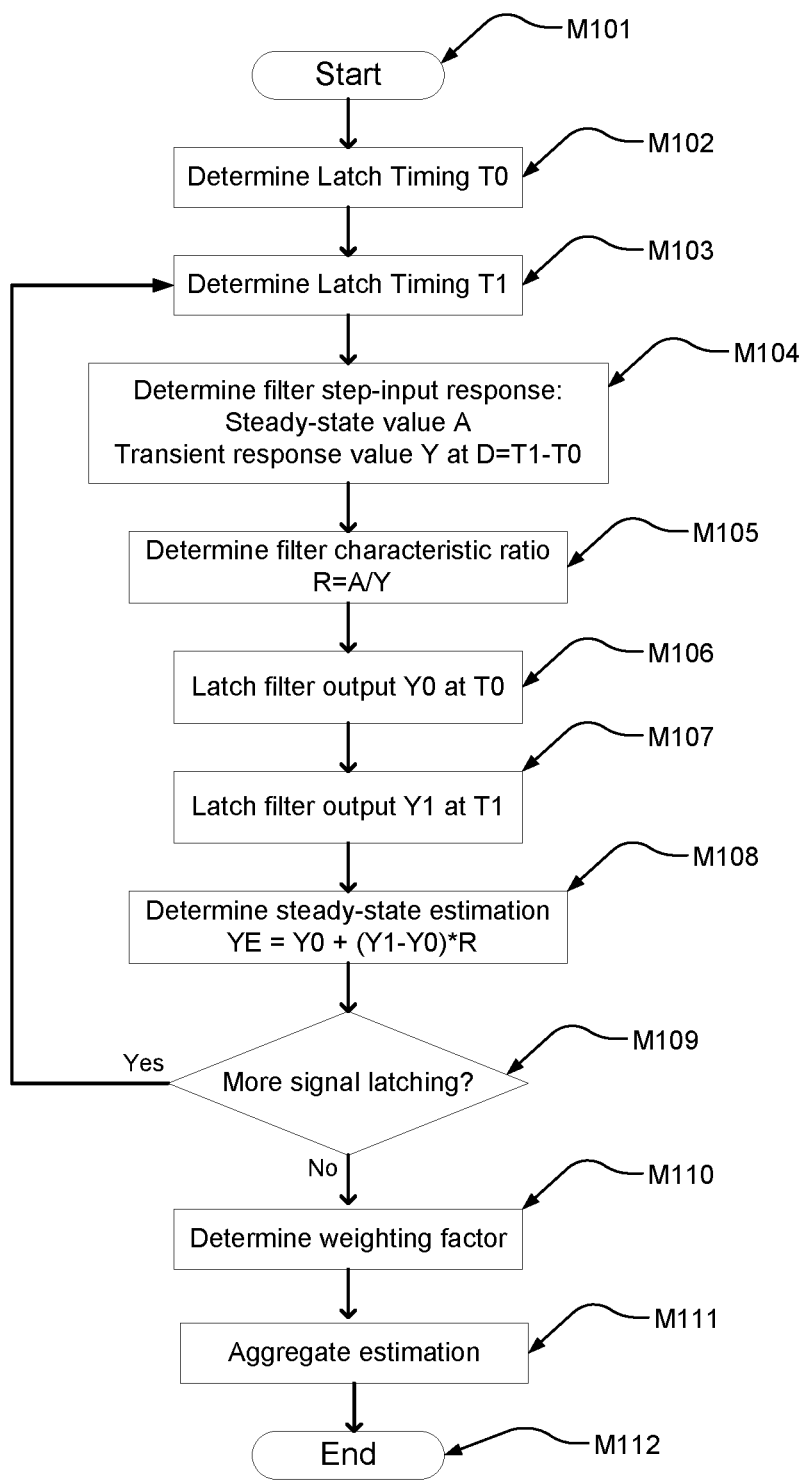
FIG. 17 is a flow diagram illustration of a method of operating the predictive filter module according to the principle of the present invention.

Referring now to FIG. 17 a flow diagram illustration of an operating method M1 of the predictive filter module 701 is shown. The operating method M1 may start in step M101. The predictive filter module 701 determines a latch timing T0 in step M102 and a latch timing T1 at step M103. The predictive filter module 701 determines a filter step-input response in step M104 including determining a steady-state value A and a transient response value Y. The step-input response is measured with the filter initial condition set at zero, and the transient response Y is taken at a timing D equal to the difference of T1 and T0 after initiation of the step input.

In step M105 a filter characteristic ratio R is determined. The filter characteristic ratio is equal to the steady-state value A divided by the transient value Y taken from the step input response of the filter.

In step M106 a filter output Y0 is latched at timing of T0, and in step M107 a filter output Y1 is latched at timing of T1.

An estimation of filter steady-state value YE is determined in step M108 based on a formula $$YE=Y0+(Y1-Y0)*R.$$

In step M109 the process is directed to step M103 if more latching of signals is needed, otherwise the process proceeds to step M110 to determine necessary weighting factors, and proceeds to step M111 for aggregation of the estimation based on the estimation of the steady-state values.

Figure 18:
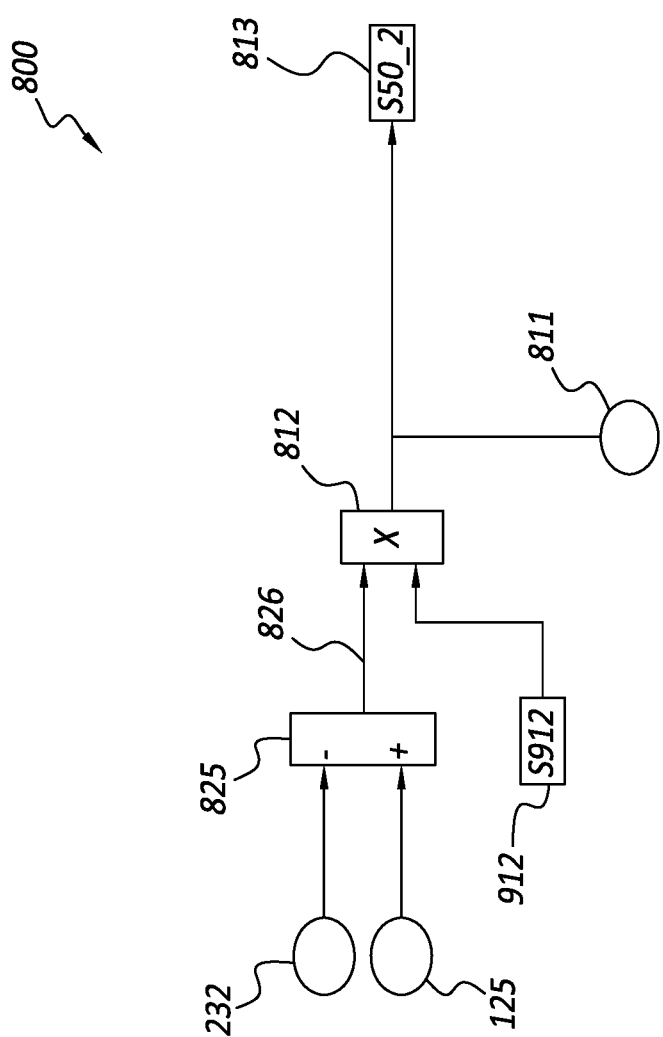
FIG. 18 is a schematic diagram of a vehicle linear acceleration signal module for the road slope estimation system according to the principle of the present invention.

Referring now to FIG. 18 a schematic diagram of the vehicle linear acceleration signal module 800 is shown. The vehicle linear acceleration signal module 800 may include a chassis acceleration signal generator module 825 which receives the filtered compensated accelerometer offset signal 232 and the accelerometer-based acceleration signal 125 as input signals and generate a chassis acceleration signal 826 by removing the offset from the signal. The vehicle linear acceleration signal module 800 may also include a vehicle linear acceleration signal generator module 812 which makes sign adjustment of the chassis acceleration signal 826 based on information of vehicle motion direction indicated by the vehicle motion direction signal 912. The vehicle linear acceleration signal module 800 may generate a vehicle linear acceleration signal for APA controller 813 to the APA controller 20, and the vehicle linear acceleration signal 811 to one or more of the modules of the RSES 30.

Figure 19:
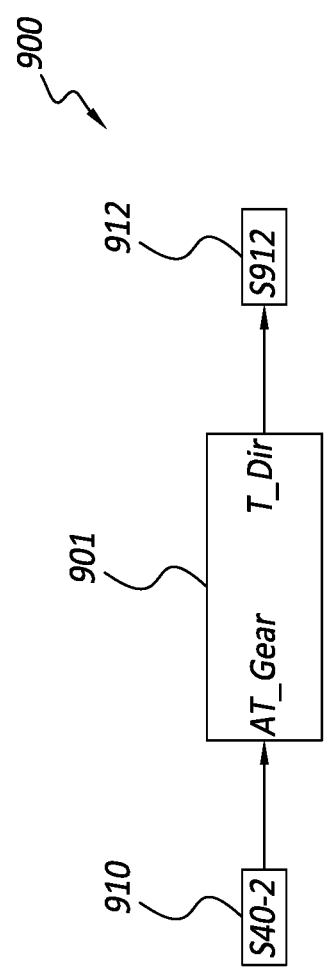
FIG. 19 is a schematic diagram of a vehicle motion direction signal module for the road slope estimation system according to the principle of the present invention.

Referring now to FIG. 19 a schematic diagram of the vehicle motion direction signal module 900 is shown. The vehicle motion direction signal module 900 may include a vehicle motion direction signal process module 901 which receives a vehicle transmission gear status signal 910 from the APA controller 20 and generates the vehicle motion direction signal 912 based on the information of the vehicle transmission gear status signal 910 for one or more of the modules of the RSES 30.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A road slope estimation system operating in conjunction with a vehicle automatic parking assist controller (APA controller) to generate road slope information for the APA controller, said road slope estimation system comprising:
   a synchronized filter firmware module (100) in electrical signal communication with the APA controller, said synchronized filter firmware module receiving vehicle operation signals from the APA controller wherein the vehicle operation signals comprise a vehicle speed signal input and a chassis accelerometer signal input;
   a noise & disturbance rejection (NDR) filter firmware module (200) in electrical signal communication with the synchronized filter firmware module, said NDR filter firmware module receiving a raw accelerometer offset signal from the synchronized filter firmware module;
   a dynamic compensator firmware module (300) in electrical signal communication with the NDR filter firmware module, said dynamic compensator firmware module generating a dynamic compensation signal to the NDR filter firmware module;
   a braking condition monitor (400) in electrical signal communication with the APA controller, said braking condition monitor receiving braking signals from the APA controller, wherein the braking signals comprising at least one of a vehicle brake pedal switch signal, an APA deceleration command signal, an APA normal brake command signal and an APA hard brake command signal;
   a NDR filter operation status controller (500) in electrical signal communication with the APA controller, the NDR filter firmware module and the braking condition monitor; said NDR filter operation status controller generating a vehicle stand-still status signal and a NDR filter status signal to the NDR filter firmware module, and receiving a brake activity status signal from the braking condition monitor;
   a slew rate adjustment firmware module (600) in electrical signal communication with the NDR filter firmware module and the braking condition monitor; said slew rate adjustment firmware module generating a slew rate adjustment reference signal to the NDR filter firmware module and receiving the brake activity status signal from the braking condition monitor;
   a predictive road slope generator firmware module (700) in electrical signal communication with the APA controller, the NDR filter firmware module and the NDR filter operation status controller; said predictive road slope generator firmware module receiving a NDR filter output signal from the NDR filter firmware module, receiving a vehicle stand-still status signal from the NDR filter operation status controller, and generating a predictive road slope signal to the APA controller;
   a vehicle linear acceleration signal firmware module (800) in electrical signal communication with the APA controller, the NDR filter firmware module, the dynamic compensator firmware module and the NDR filter operation status controller; said vehicle linear acceleration signal firmware module receiving a filtered compensated accelerometer offset signal from the NDR filter firmware module, generating a vehicle linear acceleration signal to the dynamic compensator firmware module, receiving the vehicle stand-still status signal from the NDR filter operation status controller, and generating a vehicle linear acceleration signal for APA controller to the APA controller; and
   a vehicle motion direction signal firmware module (900) in electrical signal communication with the APA controller, the NDR filter firmware module, the predictive road slope generator firmware module and the vehicle linear acceleration signal firmware module; said vehicle motion direction signal firmware module receiving a vehicle transmission gear status signal from the APA controller, and generating a vehicle motion direction signal to the NDR filter firmware module, the predictive road slope generator firmware module and the vehicle linear acceleration signal firmware module.

2. The road slope estimation system as in claim 1 wherein the synchronized filter firmware module further comprises: a speed derivative processing filter (101) and a chassis accelerometer processing filter (102), wherein the speed derivative processing filter further comprises a speed signal differentiation FIR filter that generates a first vehicle acceleration signal, and the chassis accelerometer processing filter further comprises an accelerometer signal FIR filter that generates a second vehicle acceleration signal, and wherein the speed signal differentiation FIR filter and the accelerometer signal FIR filter are characterized by generating respective filter responses of substantially the same group delay so that the first vehicle acceleration signal and the second vehicle signal are synchronized.

3. The road slope estimation system as in claim 1 wherein the dynamic compensator firmware module further comprises: a compensation signal generation firmware module (301) receiving the vehicle linear acceleration signal, wherein the compensation signal generation module further comprises a differentiation module characterized by generating a filtered time derivative signal of the vehicle linear acceleration signal without taking time difference of the vehicle linear acceleration signal.

4. The road slope estimation system as in claim 1 wherein the predictive road slope generator firmware module further comprises: an initial signal latch firmware module (711) that latches an initial value of the NDR filter output signal and generates a latched initial signal; and a predictive signal generator firmware module (712) that generates a predictive filter signal based on the latched initial signal and the NDR filter output signal, further comprising a filter steady-state estimation firmware module that estimates a future filter steady-state output based predetermined filter characteristics.

* * * * *